United States Patent
Gupta et al.

(10) Patent No.: US 11,824,795 B2
(45) Date of Patent: Nov. 21, 2023

(54) COMMUNICATION CHANNELS WITH BOTH SHARED AND INDEPENDENT RESOURCES

(71) Applicant: Apple Inc., Cupertino, CA (US)

(72) Inventors: Rohit K. Gupta, Santa Clara, CA (US); Gregory S. Mathews, Saratoga, CA (US); Harshavardhan Kaushikkar, San Jose, CA (US); Jeonghee Shin, Sunnyvale, CA (US); Rohit Natarajan, Sunnyvale, CA (US)

( * ) Notice: Subject to any disclaimer, the term of this patent is extended or adjusted under 35 U.S.C. 154(b) by 84 days.

(21) Appl. No.: 17/455,321

(22) Filed: Nov. 17, 2021

(65) Prior Publication Data

US 2023/0064187 A1 Mar. 2, 2023

Related U.S. Application Data

(60) Provisional application No. 63/239,131, filed on Aug. 31, 2021.

(51) Int. Cl.
*H04L 12/801* (2013.01)
*H04L 47/80* (2022.01)
*H04L 47/25* (2022.01)
*H04L 47/10* (2022.01)

(52) U.S. Cl.
CPC .......... *H04L 47/805* (2013.01); *H04L 47/25* (2013.01); *H04L 47/39* (2013.01)

(58) Field of Classification Search
CPC ........ H04L 47/25; H04L 47/39; H04L 47/805
USPC ......................................................... 370/329
See application file for complete search history.

(56) References Cited

U.S. PATENT DOCUMENTS

| | | | |
|---|---|---|---|
| 7,165,131 B2 | 1/2007 | Creta et al. | |
| 9,860,173 B2 | 1/2018 | Ajanovic et al. | |
| 10,545,701 B1* | 1/2020 | Mathews | G06F 3/0611 |
| 2011/0276699 A1* | 11/2011 | Pedersen | H04L 47/24 |
| | | | 709/227 |
| 2013/0086288 A1* | 4/2013 | Lakshmanamurthy | ...... |
| | | | G06F 13/364 |
| | | | 710/113 |
| 2016/0182391 A1* | 6/2016 | Theobald | H04L 47/39 |
| | | | 370/230 |
| 2016/0188529 A1* | 6/2016 | Nagarajan | G06F 15/781 |
| | | | 711/151 |
| 2019/0004862 A1* | 1/2019 | Bernat | G06F 9/5005 |

(Continued)

*Primary Examiner* — Robert J Lopata
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to merging virtual communication channels in a portion of a computing system. In some embodiments, a communication fabric routes first and second classes of traffic with different quality-of-service parameters, using a first virtual channel for the first class and a second virtual channel for the second class. In some embodiments, a memory controller communicates, via the fabric, using a merged virtual channel configured to handle traffic from both the first virtual channel and the second virtual channel. In some embodiments, the system limits the rate at which an agent is allowed to transmit requests of the second class of traffic, but requests by the agent for the first class of traffic are not rate limited. Disclosed techniques may improve independence of virtual channels, relative to sharing the same channel in an entire system, without unduly increasing complexity.

20 Claims, 7 Drawing Sheets

(56) References Cited

U.S. PATENT DOCUMENTS

| | | | |
|---|---|---|---|
| 2019/0116129 A1* | 4/2019 | Wang | H04L 45/302 |
| 2019/0356611 A1 | 11/2019 | Das Sharma et al. | |
| 2020/0322973 A1* | 10/2020 | Li | H04W 72/1268 |
| 2021/0068114 A1* | 3/2021 | Xu | H04W 72/53 |
| 2022/0174683 A1* | 6/2022 | Alabbasi | H04W 72/56 |
| 2022/0357879 A1* | 11/2022 | Mathews | G06F 3/0644 |
| 2022/0360461 A1* | 11/2022 | Raleigh | H04L 41/0893 |

* cited by examiner

COMMUNICATION CHANNELS WITH BOTH SHARED AND INDEPENDENT RESOURCES

This application claims priority to U.S. Provisional Appl. No. 63/239,131 filed on Aug. 31, 2021, which is incorporated by reference herein in its entirety.

BACKGROUND

Technical Field

This disclosure relates generally to communication fabrics in computing systems and more particularly to merging channel resources for different types of traffic.

Description of the Related Art

Digital systems of various sorts include one or more integrated circuits connected together to implement the desired operation of the system. The interconnect between the integrated circuits, and on-chip interconnect between various sub-blocks within an integrated circuit, supports communication between and within the circuits to allow the integrated circuits and sub-blocks to perform the desired processing.

Often, an interconnect is shared by one or more initiators of transactions on the interconnect. The initiators (such as integrated circuits on a chip circuit interconnect or sub-blocks in an integrated circuit for an intra-chip interconnect) are referred to as "agents." Responders on the interconnect may be referred to as agents. Multiple communications over the interconnect may occur to complete a transaction (e.g., a request from an initiating agent, a response from the responding agent, various coherency communications for cache coherent networks, etc.). The interconnect may have a variety of topologies and protocols (e.g., shared buses, point to point connections between agents, mesh networks, etc., and combinations thereof).

A shared interconnect may become a bottleneck for communications, and various agents may be prevented from achieving high bandwidth and/or low latency completion of transactions when the traffic on the shared interconnect is high. One mechanism to improve the sharing of the interconnect is virtual channels. Multiple virtual channels can use the same physical channel (the interconnect) to communicate, but are logically independent. That is, a lack of resources to transmit a communication in one virtual channel (e.g., a location in a buffer at receiving agent or intermediate circuit on the interconnect) does not prevent a communication in another virtual channel from being transmitted. Coupled with arbitration schemes at various points in the interconnect that treat different virtual channels differently (e.g., one channel may be given higher priority than another), high bandwidth and/or low latency may be achieved on a channel even when there is significant traffic on the interconnect.

DETAILED DESCRIPTION

Figure 1:
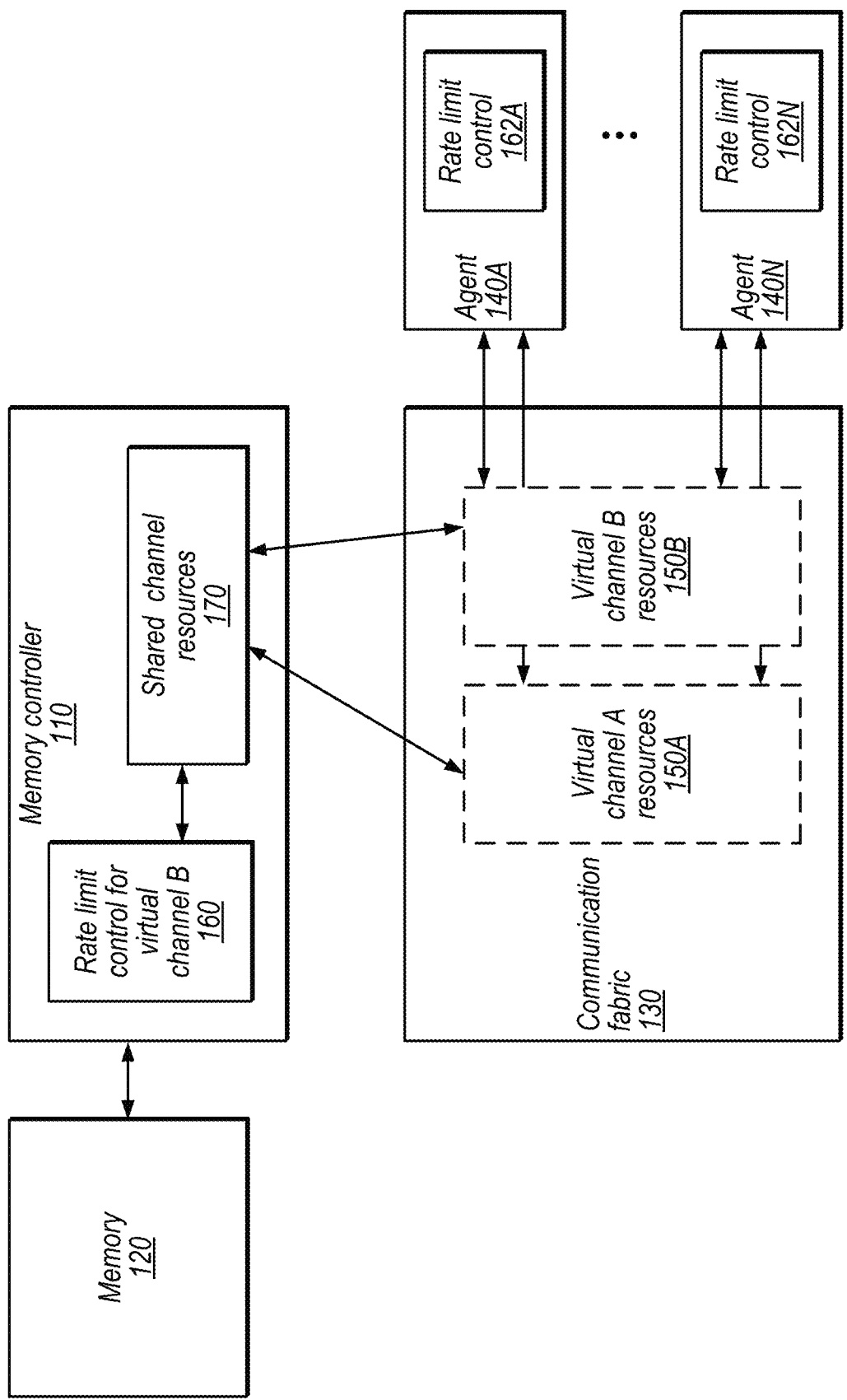
FIG. 1 is a block diagram illustrating an example system with virtual channels that are separate in a portion of the system and merged in another portion, according to some embodiments.

In disclosed embodiments, an agent (e.g., a memory controller) and communication fabric may support multiple classes of traffic. In some embodiments, these classes are assigned to channels (e.g., virtual channels) in the communication fabric. The network fabrics used by different channels may be physically independent (e.g., having dedicated wires and other circuitry that form the network), logically independent (e.g., communications sourced by agents in the SOC may be logically defined to be transmitted on a selected network of one or more networks and may not be impacted by transmission on other networks), or both. Network switches may also employ arbitration circuitry to select among buffered communications to forward on the network.

Virtual channels (VCs) are channels that physically share a network but which are logically independent on the network (e.g., communications in one virtual channel do not block progress of communications on another virtual channel). Network switches that are shared by multiple virtual channels may employ resources dedicated to each virtual channel (e.g., buffers) so that communications on the virtual channels remain logically independent.

Different traffic classes may have different quality-of-service targets or parameters. Various network components may enforce quality-of-service parameters, such as arbitration circuitry in network switches, rate limit control circuitry for one or more agents (which may include circuitry at the source, destination, or both), etc.

As one example class of traffic, a low latency traffic (LLT) class may have a quality-of-service priority for latency and the rate at which a given agent may initiate requests may be limited (e.g., using a leaky-bucket credit system).

As another example, an isochronous (ISOC) class may have a quality-of-service priority for latency but may not be rate limited. Isochronous data may be data that is provided at a regular rate over time. That is, the data may be transmitted at substantially fixed intervals in real time, and variation from the interval may cause underrun or overrun of the data. For audio data, for example, underruns may result in audible skipping in the sounds (or drop outs), and overruns may result in lost sound. U.S. patent application Ser. No. 17/220,703 filed Apr. 2, 2021 and titled "Critical Agent Identification to Modify Bandwidth Allocation in a Virtual Channel" discusses example topologies in which ISOC and LLT traffic share a virtual channel, but LLT agents have lower rate limit thresholds when an ISOC agent is active, e.g., to reduce potential interference with ISOC traffic.

In contrast, in disclosed embodiments discussed below, different traffic classes (e.g., LLT and ISOC) have separate virtual channels in a communication fabric but share a merged channel at an agent (e.g., at a memory controller).

Said another way, the overall communication system may be hybrid in the sense that one or more VCs may be logically independent in a portion of the system while being logically shared in another portion of the system. In various embodiments, this may advantageously increase independence of the different traffic classes relative to techniques such as described in the '703 application while reducing complexity and area relative to completely splitting the traffic classes.

FIG. 1 is a block diagram illustrating an example computing system with separate virtual channels that are merged at a certain point, according to some embodiments. In the illustrated embodiment, the system includes memory controller 110, memory 120, communication fabric 130, and agents 140A-140N.

Memory controller 110, in the illustrated embodiment, is configured to perform read and write operations to memory 120 based on requests received via communication fabric 130 from multiple different agents 140. In some embodiments, memory controller 110 includes a memory cache and is configured to service requests via the cache (without accessing memory 120) to the extent possible.

Communication fabric 130, in the illustrated embodiment, implements at least two virtual channels A and B. As shown, communication fabric 130 includes at least some resources that are independent for the two virtual channels (e.g., virtual channel resources 150A and 150B). As one example, while these channels may share fabric elements such as switches, they may have separate buffers in each switch for queuing their requests. As shown, a given agent may select to submit requests via either channel A or channel B (although some agents may support only a proper subset of the virtual channels implemented by communication fabric 130).

At memory controller 110, in the illustrated embodiment, the two virtual channels A and B are merged and share channel resources 170. For example, both channels may share a buffer, even though the merged channel may support different types of traffic such as LLT and ISOC.

In the illustrated embodiment, memory controller 110 and agents 140 implement rate limiting for virtual channel B (which may be used for LLT traffic) via rate limit control circuitry 160 and 162. This circuitry may implement a leaky-bucket credit system to provide fairness among agents, e.g., to ensure that one agent does not overly reduce latency for other agents.

According to a leaky-bucket technique, credits for transmitting LLT transactions are refilled (e.g., periodically) into the bucket, and the credits are consumed (leaked) from the bucket as transactions are issued. The bucket may have a threshold number of credits that the bucket is configured to hold (which may be programmable) and incoming credits after reaching the threshold point will overflow rather than being added to the bucket. If the bucket becomes empty (no credits remain), the rate limiter circuit may prevent issuance of additional LLT transactions until sufficient credits have accumulated via the periodic refill mechanism. It is noted that the credits for the rate limit circuitry may be different from credits used in a communication fabric to ensure that resources are available at a receiving agent or intermediate circuit to handle a given transaction. Thus, a transaction request may need to have an appropriate number of the fabric resource credits to be issued by a requesting agent in addition to rate limit credits associated with the memory controller, for example. In some embodiments, the consumed credits may be added to a counter representing the bucket, and refill credits may be subtracted from the counter (e.g., the counter may be part of the control circuit 40). In this embodiment, a counter of zero may represent a full bucket and a counter equal to the limit may indicate an empty bucket (no transactions to be sent). In other embodiments, refill credits may be added to the counter and consumed credits may be subtracted from the counter, and a counter equal to zero may indicate an empty bucket and a counter value equal to the limit may indicate a full bucket.

In the illustrated embodiment, memory controller 110 does not limit the rate at which agents are allowed to transmit requests for virtual channel A (which may be used for ISOC traffic). In various embodiments, this may advantageously reduce or avoid LLT traffic interfering with the latency of ISOC traffic while sharing some resources between LLT and ISOC and providing a rate limit for LLT.

In some embodiments, one or more rate limiters may lower the rate limits for LLT traffic when an isochronous agent is active, e.g., as described in the '703 application, even though parts of the LLT and ISOC channels are split. In some embodiments, some rate limiters may change their rate in this situation (e.g., intermediate limiters for a memory cache, not shown in FIG. 1) while other limiters do not change their rate (e.g., MCU limiter 160).

Figure 2:
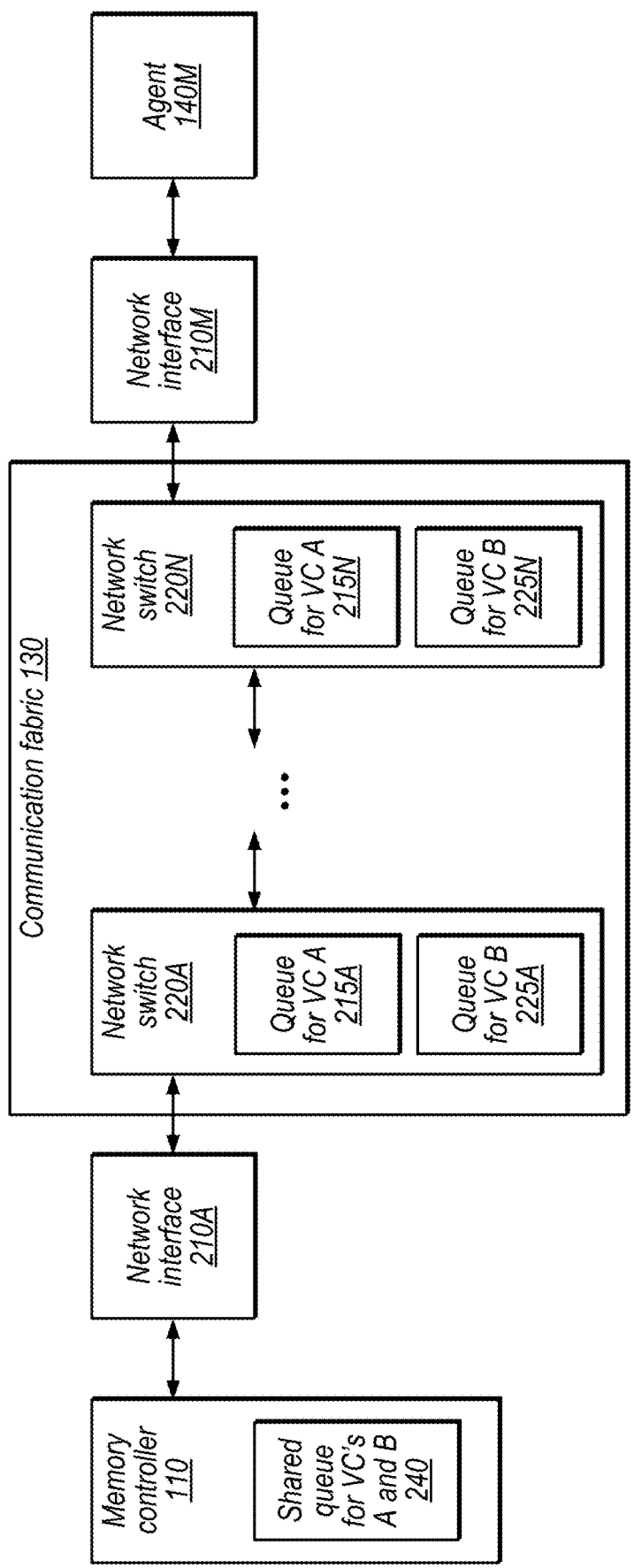
FIG. 2 is block diagram illustrating an example communication fabric with separate network switch buffers for different virtual channels, according to some embodiments.

FIG. 2 is a block diagram illustrating example communication fabric resources for different virtual channels, according to some embodiments. In the illustrated example, the memory controller 110 and a given agent 140M communicate with the fabric 130 via respective network interfaces 210.

Communication fabric 130, in the illustrated embodiment, includes a number of network switches 220A-220N. These switches may be configured according to any of various appropriate topologies such as a ring, mesh, chain, star, etc. The switches may route requests, e.g., based on an identifier or address of the target agent.

Network switches 220, in the illustrated embodiment, include separate independent queues for different virtual channels. For example, network switch 220 includes a queue 215A for virtual channel A and a queue 225A for virtual channel B. This may facilitate logical independence of the two virtual channels in the fabric. In contrast, requests from the two channels are buffered together in the memory controller in shared queue 240, in the illustrated embodiment.

Note that in other embodiments, different virtual channels may use different networks of network switches (e.g., may be physically independent as well as logically independent, at least until merged) for a portion of their communications.

Further, while queues and buffers are discussed herein as examples of resources that are separate for multiple virtual channels in one portion of the system and shared in another portion, these components are included for purposes of illustrated and are not intended to limit the scope of the present disclosure. In other embodiments, any of various communication resources may be separate for multiple virtual channels in one portion of the system and shared in another portion.

Figure 3:
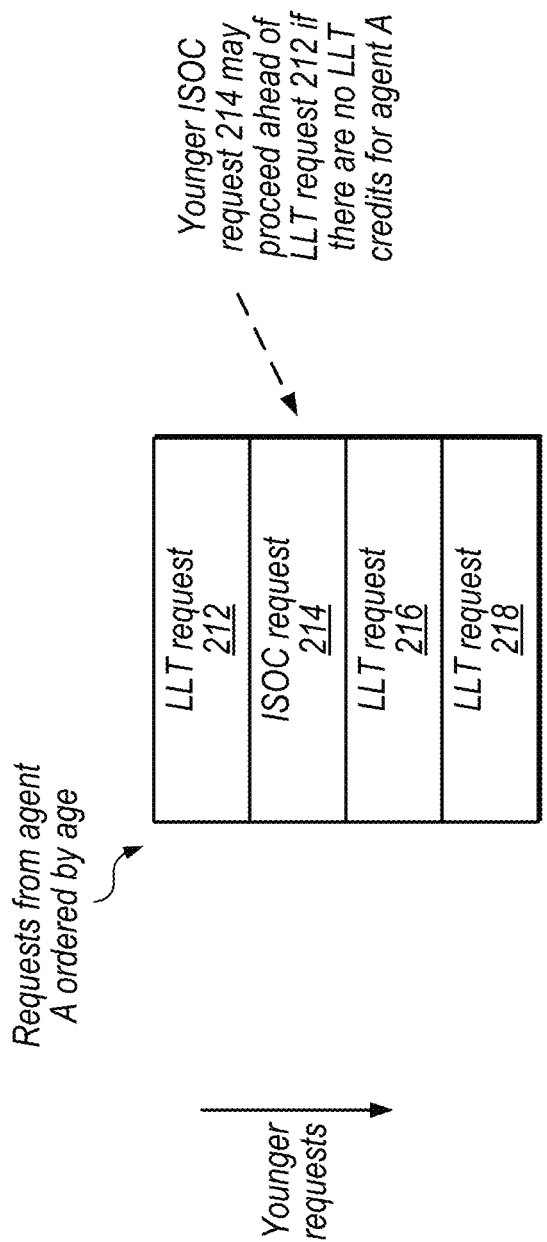
FIG. 3 is a diagram illustrating example selection of an ISOC request that is older than an LLT request based on rate limiting, according to some embodiments.

FIG. 3 is a diagram illustrating example selection of an ISOC request that is older than an LLT request based on rate limiting, according to some embodiments. As discussed above, ISOC traffic may not be subject to rate limiting. In the illustrated example, requests to the memory controller are sorted by age with older requests shown lower in the figure (although the various illustrated requests may be stored in separate buffers at the client, in the fabric, or both).

As shown, ISOC request 214 is relatively younger than LLT request 212 (while requests 216 and 218 are older). ISOC request 214 may, however, be allowed to proceed ahead of older LLT request (even if a default arbitration scheme gives priority to older requests) in a situation where LLT is rate limited. More generally, ISOC requests may be selected ahead of LLT traffic in various arbitration schemes when LLT traffic is rate limited, e.g., due to a lack of leaky-bucket credits.

Example Method

Figure 4:
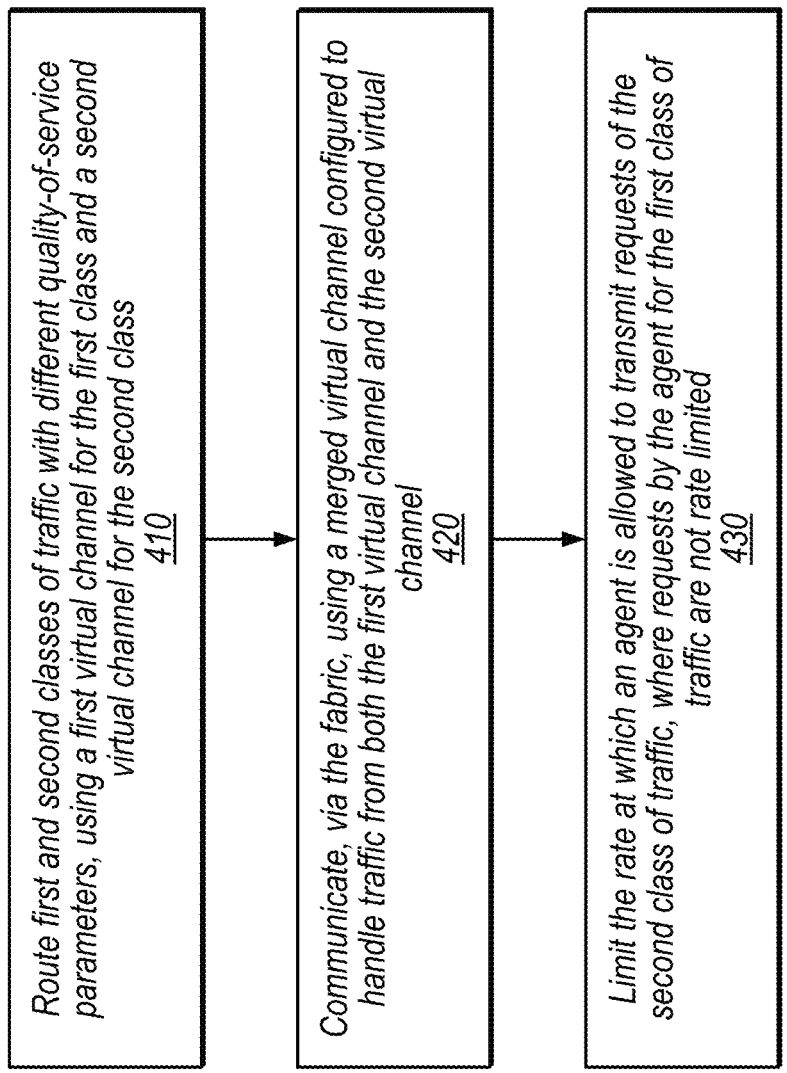
FIG. 4 is a flow diagram illustrating an example method, according to some embodiments.

FIG. 4 is a flow diagram illustrating an example method for using merged virtual channels, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a communication fabric routes first and second classes of traffic with different quality-of-service parameters, using a first virtual channel for the first class and a second virtual channel for the second class. In some embodiment's, the first class of traffic has an isochronous property and has a low-latency quality-of-service parameter and the second class of traffic has a low-latency quality-of-service parameter. In some embodiment's, the communication fabric includes separate buffer circuitry in a network switch for the first and second virtual channels.

At 420, in the illustrated embodiment, a memory controller communicates, via the fabric, using a merged virtual channel configured to handle traffic from both the first virtual channel and the second virtual channel. In some embodiments, the merged channel uses at least one shared buffer for both the first and second virtual channels.

At 420, in the illustrated embodiment, the system limits the rate at which an agent is allowed to transmit requests of the second class of traffic, where requests by the agent for the first class of traffic are not rate limited.

In some embodiments, the control circuitry implements a credit system for rate limiting under which selection of a request from the second virtual channel consumes a credit and requests from the first virtual channel do not require or consume credits. In some embodiments, the memory controller is configured to detect a field in a request of the first class of traffic that indicates not to return a free credit. A free credit refers to a credit returned to an agent's rate limit control 162 by memory controller 110 because a request could be completed without consuming credits by rate limit control 160. In some embodiments, the credit system is a leaky-bucket system in which credits are provided to a given agent over time.

In some embodiments, the memory controller circuitry is configured to service a first request of the first class prior to a second request of the second class, based on rate limiting of the second class, where the first request is a younger request than the second request.

In some embodiments, the control circuitry is configured to impose different rate limits on the second class of traffic based on whether one or more agents that utilize the first class of traffic are active.

Example Device

Figure 5:
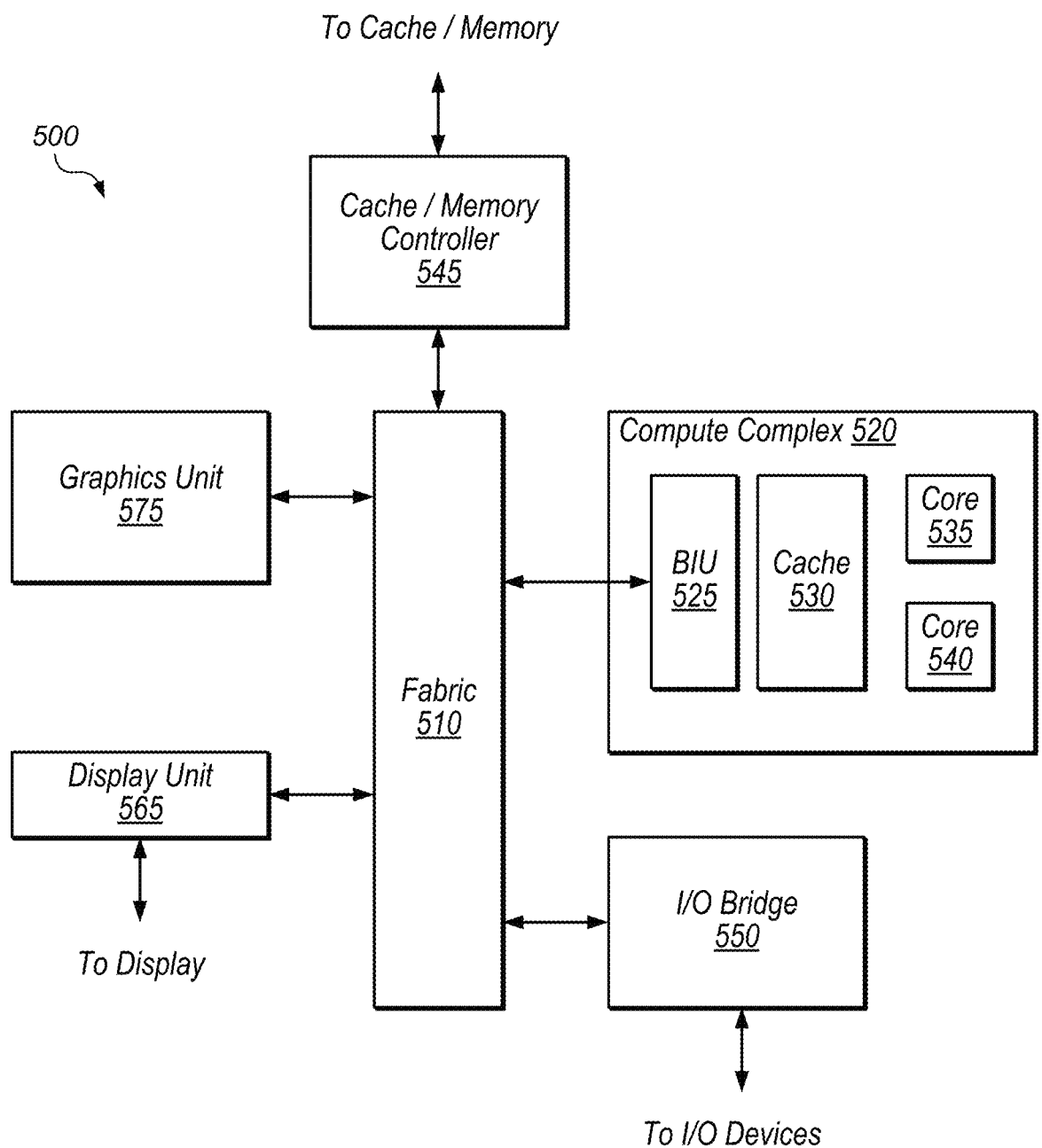
FIG. 5 is a block diagram illustrating an example computing device, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 575, and display unit 565. In some embodiments, device 500 may include other components (not shown) in addition to or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In some embodiments, fabric 510 and cache/memory controller 545 implement the hybrid virtual channel techniques discussed above.

In the illustrated embodiment, compute complex 520 includes bus interface unit (BIU) 525, cache 530, and cores 535 and 540. In various embodiments, compute complex 520 may include various numbers of processors, processor cores and caches. For example, compute complex 520 may include 1, 2, or 4 processor cores, or any other suitable number. In one embodiment, cache 530 is a set associative L2 cache. In some embodiments, cores 535 and 540 may include internal instruction and data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 575 may be described as "coupled to" a memory through fabric 510 and cache/memory controller 545. In contrast, in the illustrated embodiment of FIG. 5, graphics unit 575 is "directly coupled" to fabric 510 because there are no intervening elements.

Graphics unit 575 may include one or more processors, e.g., one or more graphics processing units (GPU's). Graphics unit 575 may receive graphics-oriented instructions, such as OPENGL®, Metal, or DIRECT3D® instructions, for example. Graphics unit 575 may execute specialized GPU instructions or perform other operations based on the received graphics-oriented instructions. Graphics unit 575 may generally be configured to process large blocks of data in parallel and may build images in a frame buffer for output to a display, which may be included in the device or may be a separate device. Graphics unit 575 may include transform, lighting, triangle, and rendering engines in one or more graphics processing pipelines. Graphics unit 575 may output pixel information for display images. Graphics unit 575, in various embodiments, may include programmable shader circuitry which may include highly parallel execution cores configured to execute graphics programs, which may include pixel tasks, vertex tasks, and compute tasks (which may or may not be graphics-related).

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and low-power always-on functionality, for example. I/O bridge 550 may also include interfaces such as pulse-width modulation (PWM), general-purpose input/output (GPIO), serial peripheral interface (SPI), and inter-integrated circuit (I2C), for example. Various types of peripherals and devices may be coupled to device 500 via I/O bridge 550.

In some embodiments, device 500 includes network interface circuitry (not explicitly shown), which may be connected to fabric 510 or I/O bridge 550. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 500 with connectivity to various types of other devices and networks.

Example Applications

Figure 6:
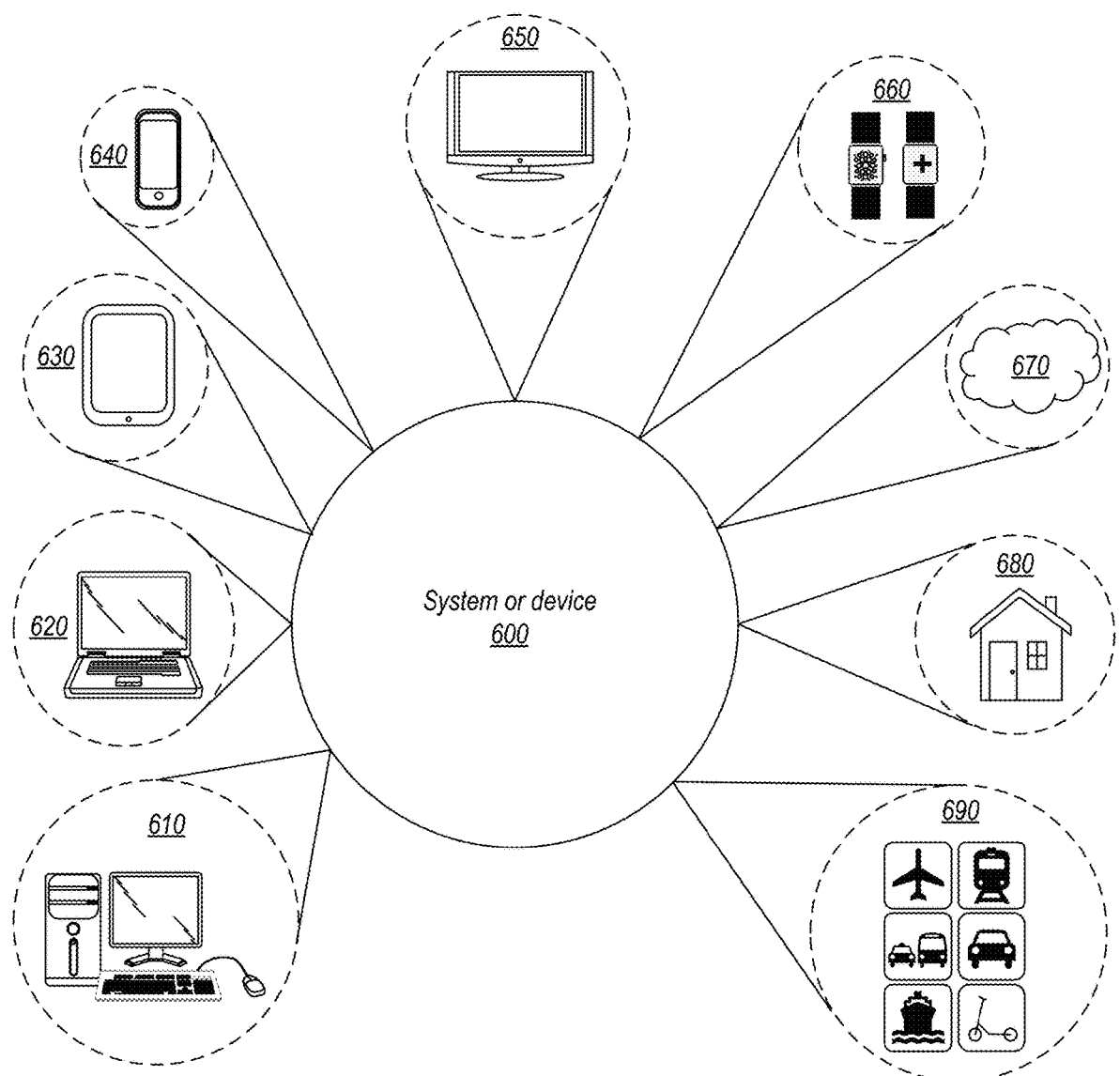
FIG. 6 is a diagram illustrating example applications of disclosed systems and devices, according to some embodiments.

Turning now to FIG. 6, various types of systems that may include any of the circuits, devices, or system discussed above. System or device 600, which may incorporate or otherwise utilize one or more of the techniques described herein, may be utilized in a wide range of areas. For example, system or device 600 may be utilized as part of the hardware of systems such as a desktop computer 610, laptop computer 620, tablet computer 630, cellular or mobile phone 640, or television 650 (or set-top box coupled to a television).

Similarly, disclosed elements may be utilized in a wearable device 660, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 600 may also be used in various other contexts. For example, system or device 600 may be utilized in the context of a server computer system, such as a dedicated server or on shared hardware that implements a cloud-based service 670. Still further, system or device 600 may be implemented in a wide range of specialized everyday devices, including devices 680 commonly found in the home such as refrigerators, thermostats, security cameras, etc. The interconnection of such devices is often referred to as the "Internet of Things" (IoT). Elements may also be implemented in various modes of transportation. For example, system or device 600 could be employed in the control systems, guidance systems, entertainment systems, etc. of various types of vehicles 690.

The applications illustrated in FIG. 6 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
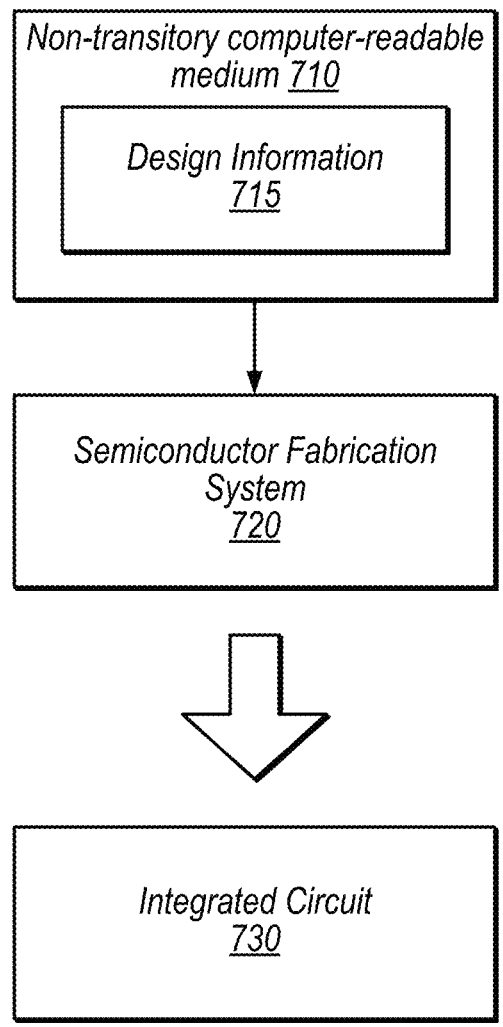
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis, layout, or both of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1, 2, and 5. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application (including Appendix A, which includes material from two prior patent applications relating to rate limiting and communication fabric channels) may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
 a communication fabric that supports first and second classes of traffic with different quality-of-service parameters, wherein the communication fabric implements a first virtual channel with first buffer circuitry for the first class and a second virtual channel with second buffer circuitry for the second class;
 multiple agents configured to communicate via the communication fabric using one or more virtual channels;
 memory controller circuitry configured to communicate via the communication fabric, wherein the memory controller circuitry supports a merged virtual channel configured to handle traffic from both the first virtual channel and the second virtual channel, wherein the merged virtual channel:
  shares switch circuitry of the memory controller circuitry with one or more other virtual channels supported by the memory controller circuitry; and
  shares buffer circuitry of the memory controller circuitry for data of the first and second virtual channels, wherein the buffer circuitry is separate from buffer circuitry for the one or more other virtual channels; and
 control circuitry, at least a portion of which is included in the memory controller circuitry, configured to limit the rate at which an agent is allowed to transmit requests of the second class of traffic;
 wherein the control circuitry is configured not to limit the rate at which the agent is allowed to transmit requests of the first class of traffic.

2. The apparatus of claim 1, wherein the memory controller circuitry is configured to service a first request of the first class prior to a second request of the second class, based on rate limiting of the second class, wherein the first request is a younger request than the second request.

3. The apparatus of claim 1, wherein the control circuitry implements a credit system for rate limiting under which selection of a request from the second virtual channel consumes a credit and requests from the first virtual channel do not require or consume credits.

4. The apparatus of claim 3, wherein the memory controller circuitry is configured to detect a field in a request of the first class of traffic that indicates not to return a free credit.

5. The apparatus of claim 3, wherein the credit system is a leaky-bucket system in which credits are provided to a given agent over time.

6. The apparatus of claim 1, wherein the first class of traffic has an isochronous property and has a low-latency quality-of-service parameter and wherein the second class of traffic has a low-latency quality-of-service parameter.

7. The apparatus of claim 1, wherein the communication fabric includes separate buffer circuitry in a network switch for the first and second virtual channels.

8. The apparatus of claim 1, wherein the control circuitry is configured to impose different rate limits on the second class of traffic based on whether one or more agents that utilize the first class of traffic are active.

9. The apparatus of claim 1, wherein the apparatus is a computing device that includes:
   a processor;
   a display; and
   network interface circuitry.

10. A method, comprising:
    routing, by a communication fabric of a computing system, first and second classes of traffic with different quality-of-service parameters, using a first virtual channel for the first class and a second virtual channel for the second class;
    communicating, by a memory controller via the communication fabric, using a merged virtual channel configured to handle traffic from both the first virtual channel and the second virtual channel, wherein the merged virtual channel:
      shares switch circuitry of the memory controller with one or more other virtual channels supported by the memory controller; and
      shares buffer circuitry of the memory controller for data of the first and second virtual channels, wherein the buffer circuitry is separate from buffer circuitry for the one or more other virtual channels; and
    limiting, by the computing system using control circuitry that is at least partially included in the memory controller, the rate at which an agent is allowed to transmit requests of the second class of traffic, wherein requests by the agent for the first class of traffic are not rate limited.

11. The method of claim 10, further comprising:
    servicing, by the memory controller, a first request of the first class prior to a second request of the second class, based on rate limiting of the second class, wherein the first request is a younger request than the second request.

12. The method of claim 10, wherein the limiting uses a credit system under which selection of a request from the second virtual channel consumes a credit and requests from the first virtual channel do not require or consume credits.

13. The method of claim 10, wherein the first class of traffic has an isochronous property and has a low-latency quality-of-service parameter and wherein the second class of traffic has a low-latency quality-of-service parameter.

14. The method of claim 10, wherein the limiting includes imposing different rate limits on the second class of traffic at different times based on whether one or more agents that utilize the first class of traffic are active.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
    a communication fabric that supports first and second classes of traffic with different quality-of-service parameters, wherein the communication fabric implements a first virtual channel with first buffer circuitry for the first class and a second virtual channel with second buffer circuitry for the second class;
    multiple agents configured to communicate via the communication fabric using one or more virtual channels;
    memory controller circuitry configured to communicate via the communication fabric, wherein the memory controller circuitry supports a merged virtual channel configured to handle traffic from both the first virtual channel and the second virtual channel, wherein the merged virtual channel:
      shares switch circuitry of the memory controller circuitry with one or more other virtual channels supported by the memory controller circuitry; and
      shares buffer circuitry of the memory controller circuitry for data of the first and second virtual channels, wherein the buffer circuitry is separate from buffer circuitry for the one or more other virtual channels; and
    control circuitry, at least a portion of which is included in the memory controller circuitry, configured to limit the rate at which an agent is allowed to transmit requests of the second class of traffic;
    wherein the control circuitry is configured not to limit the rate at which the agent is allowed to transmit requests of the first class of traffic.

16. The non-transitory computer readable storage medium of claim 15, wherein the memory controller circuitry is configured to service a first request of the first class prior to a second request of the second class, based on rate limiting of the second class, wherein the first request is a younger request than the second request.

17. The non-transitory computer readable storage medium of claim 15, wherein the control circuitry implements a credit system for rate limiting under which selection of a request from the second virtual channel consumes a credit and requests from the first virtual channel do not require or consume credits.

18. The non-transitory computer readable storage medium of claim 17, wherein the memory controller circuitry is configured to detect a field in a request of the first class of traffic that indicates not to return a free credit.

19. The non-transitory computer readable storage medium of claim 15, wherein the first class of traffic has an isochronous property and has a low-latency quality-of-service parameter and wherein the second class of traffic has a low-latency quality-of-service parameter.

20. The non-transitory computer readable storage medium of claim 15, wherein the communication fabric includes separate buffer circuitry in a network switch for the first and second virtual channels.

* * * * *